US006628880B2

(12) United States Patent
Roberts

(10) Patent No.: US 6,628,880 B2
(45) Date of Patent: Sep. 30, 2003

(54) FIBER OPTIC CABLE SPLICE ENCLOSURE

(75) Inventor: Jeffrey D. Roberts, Warsaw, MO (US)

(73) Assignee: Windsor Communications, Inc., Windsor, MO (US)

( * ) Notice: Subject to any disclaimer, the term of this patent is extended or adjusted under 35 U.S.C. 154(b) by 210 days.

(21) Appl. No.: 09/828,112

(22) Filed: Apr. 6, 2001

(65) Prior Publication Data

US 2002/0146229 A1 Oct. 10, 2002

(51) Int. Cl.[7] .................................................. G02B 6/00
(52) U.S. Cl. ...................................................... 385/135
(58) Field of Search ................................ 385/135, 136, 385/137, 139, 76

(56) References Cited

U.S. PATENT DOCUMENTS 5,007,701 A    4/1991   Roberts
5,048,382 A    9/1991   Mitchell
5,133,039 A    7/1992   Dixit
5,218,664 A    6/1993   O'Neill et al.
5,323,480 A    6/1994   Mullaney et al.
5,426,715 A  * 6/1995   Moisson et al. .............. 385/76
5,479,554 A   12/1995   Roberts
5,886,300 A  * 3/1999   Strickler .................... 385/134

* cited by examiner

Primary Examiner—Khiem Nguyen
(74) Attorney, Agent, or Firm—Shughart, Thomson & Kilroy; Malcolm A. Litman

(57) ABSTRACT

A fiber optic cable splice enclosure is disclosed, the enclosure comprising a cannister having an open end and an expansion seal assembly for closing the open end. The seal assembly includes a plurality of cable receiving ports for admitting fiber optic cables into the enclosure. The ports are in the form of slots extending inward from the outer edges of the seal assembly. The cannister and seal assembly are constructed with an oblong-round shape which provides for increased capacity of the cannister and more seal edge area for the seal assembly, allowing for additional ports as compared to a standard, cylindrical splice enclosure.

19 Claims, 3 Drawing Sheets

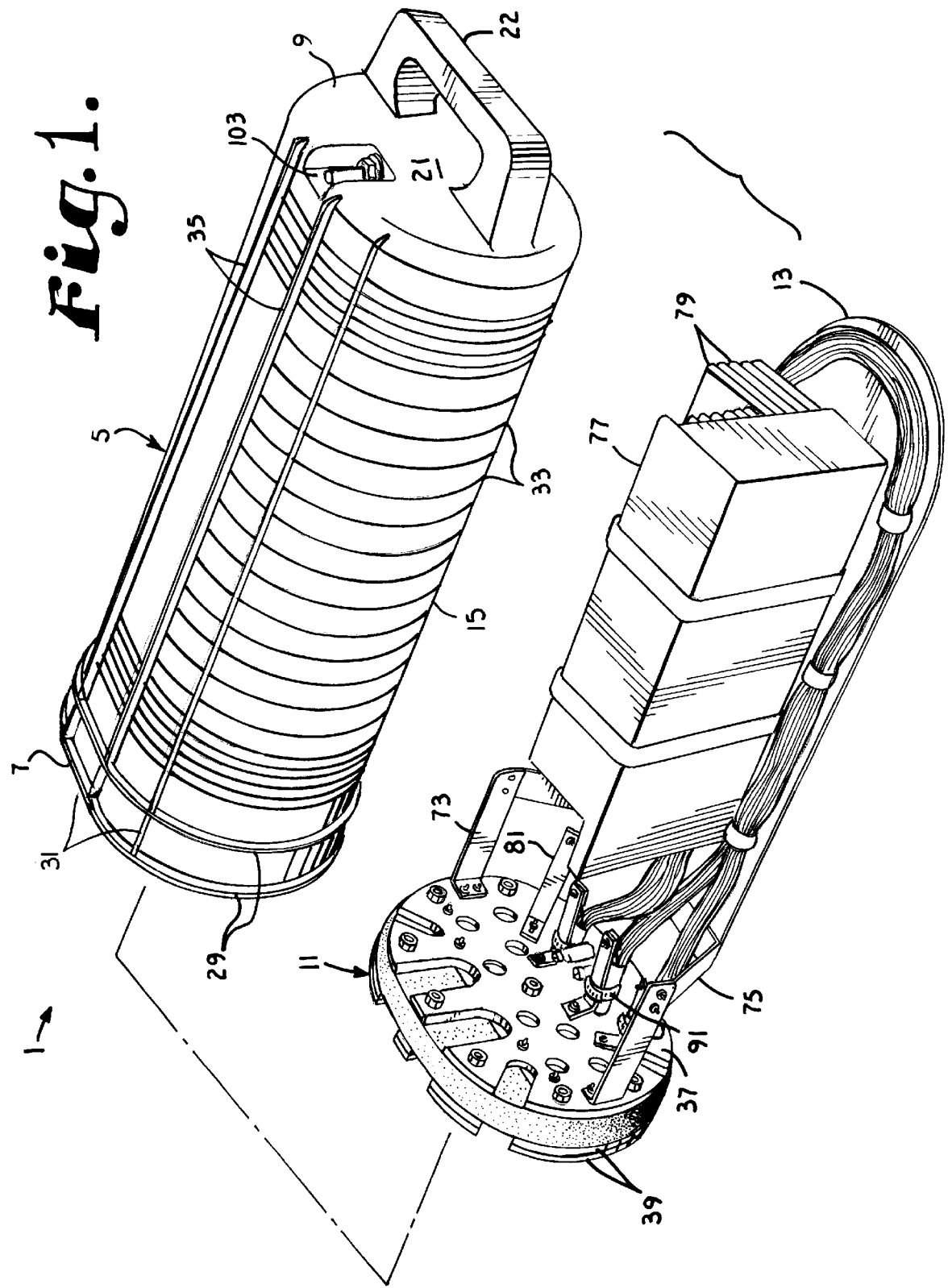

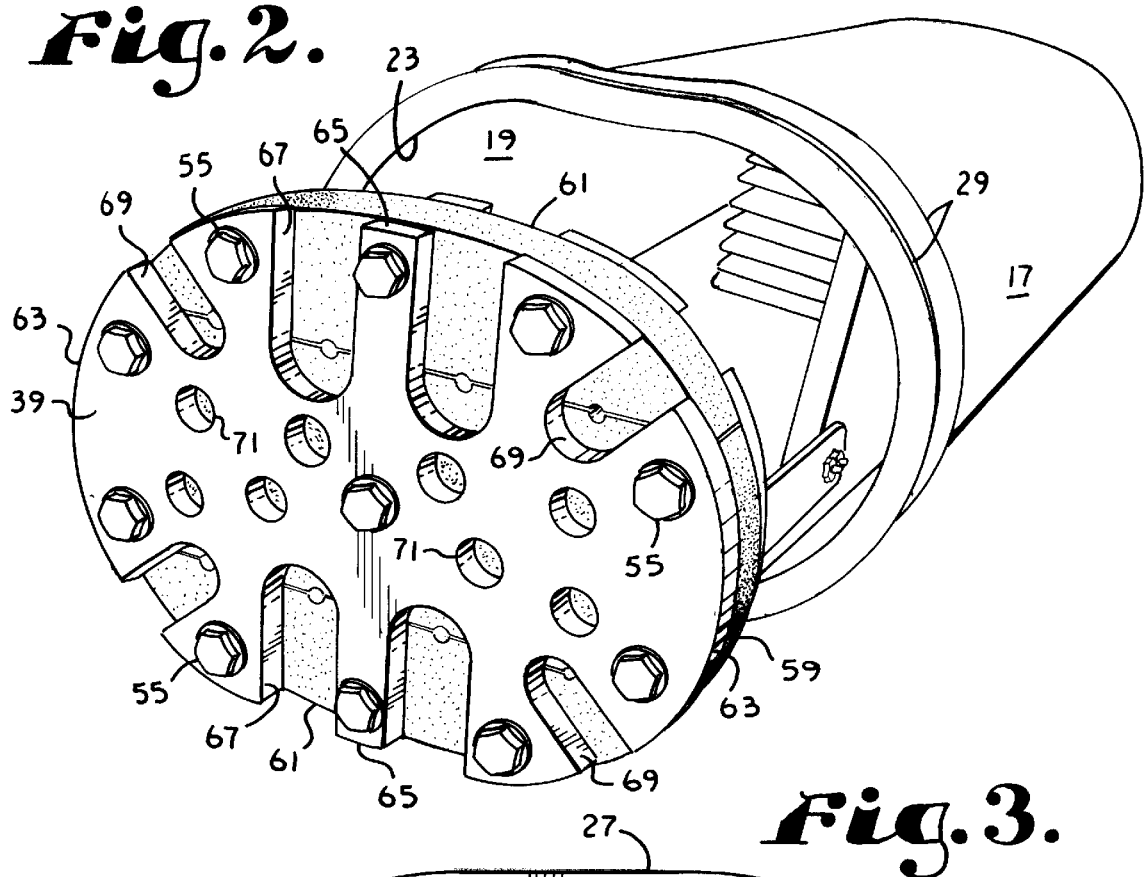
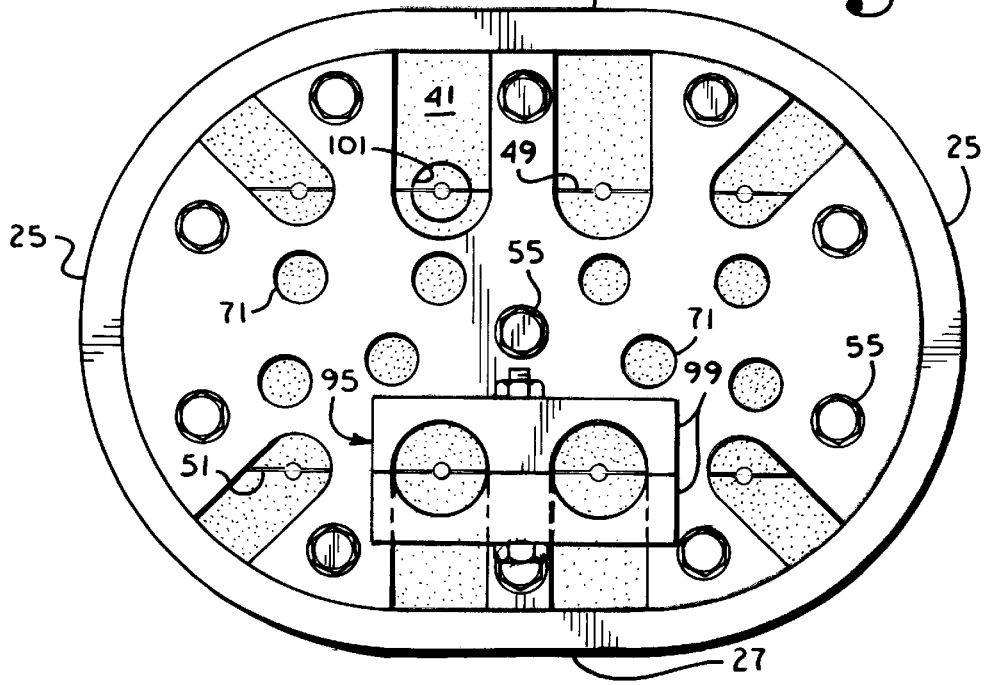

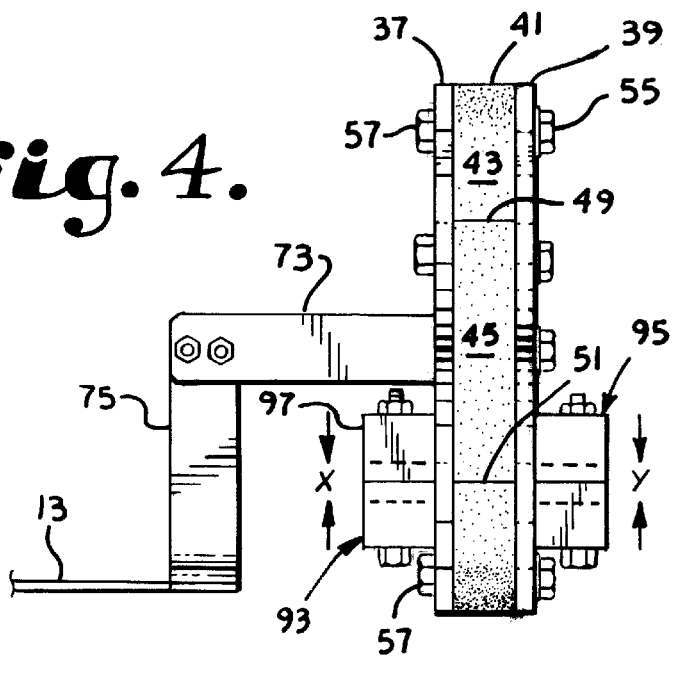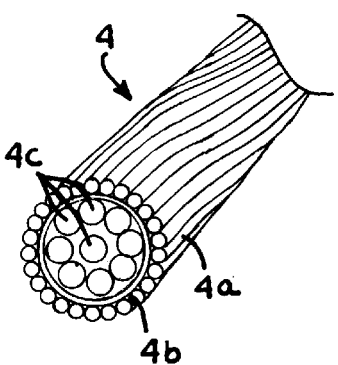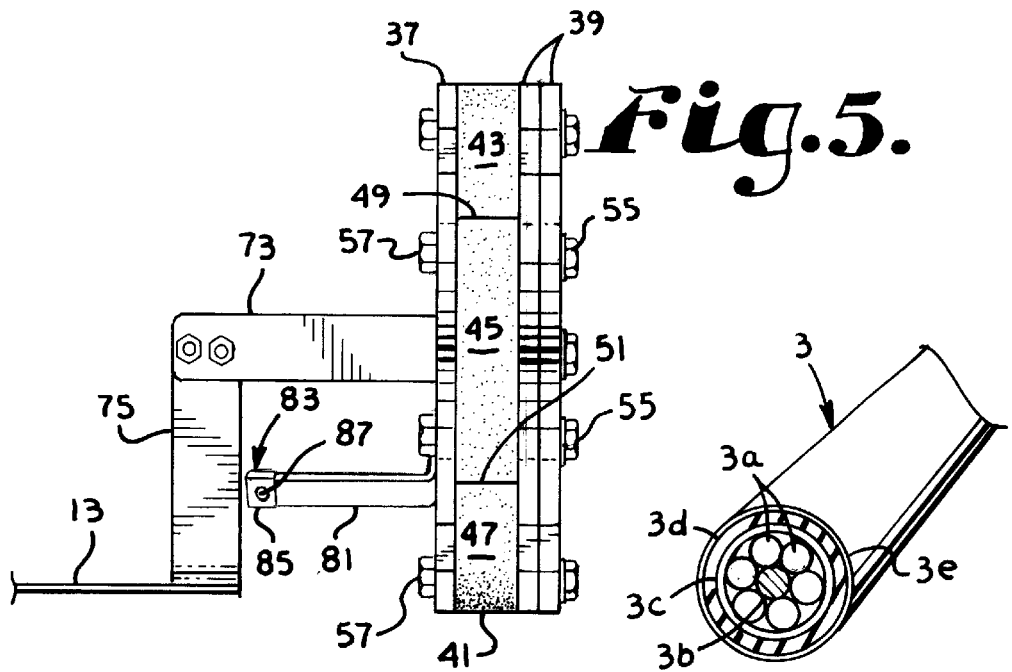

FIBER OPTIC CABLE SPLICE ENCLOSURE

BACKGROUND OF THE INVENTION

1. Field of the Invention

The invention relates to the field of telecommunications hardware, and more specifically to an environmentally secure enclosure for protecting splices between fiber optic communications cables.

2. Description of the Related Art

Over the last decade, the use of fiber optic cable for the transmission of voice, video, and data services has become increasingly common. Fiber optic cables come in a variety of types, including optical ground wire (OPGW) and all-dielectric self-supporting (ADSS) cable. Optical ground wire is designed for aerial installation on electrical transmission line towers where it replaces the existing ground cables. All dielectric self supporting cable may also be used in aerial installations, and in addition may be installed underground, either in a duct or by direct burial. The all-dielectric construction of these cables provides resistance to lightning and static discharge, negating the need for grounding. Cable which is not all-dielectric requires the use of an isolated ground.

No matter which type of fiber optic cable is used, the cables must inevitably be spliced. Splicing is required during initial installation between cable runs and at points where the cable branches. After installation splices are often required to repair breaks in the cable. A single fiber optic cable can contain hundreds of individual fibers which must be separately spliced, either by fusion or by mechanical connectors. The splices between the fibers are susceptible to degradation by moisture, and therefore the splices must be protected from the elements. It is for this reason that fiber optic cable splices are provided with weatherproof enclosures.

U.S. Pat. No. 5,007,701 ('701 patent), issued Apr. 16, 1991 to Gene Roberts and commonly owned with the present application, discloses a splice closure apparatus in which a rigid, cylindrical and weather impervious outer structure is open at both ends. A pair of end caps each include an elastomeric sealing material sandwiched between a pair of rigid plates. At least one of the end caps has openings for the passage of cables therethrough into the interior of the closure where an anchoring member is positioned to receive the cable ends and secure a splice. The elastomeric sealing material in each end cap is compressed against the sides of the outer cylinder by the plates on either side when a number of through bolts are tightened, thus forming a weather tight seal between each end cap and the cylinder wall. In addition, in each end cap with cable openings, the elastomeric material is simultaneously urged tightly against the cables, thus also forming a weather tight seal between the end cap and the cables.

U.S. Pat. No. 5,479,554 ('554 patent), issued Dec. 26, 1995 to Gene Roberts and also commonly owned with the present application, discloses an improved version of the splice closure apparatus which is specially adapted for use with optical ground cable. As is the case with the closure apparatus of the '701 patent, the closure of the '554 patent includes a weather impervious outer cylinder made of an impact and corrosion resistant material which is open at both ends and designed to hold a splicing assembly including a pair of sealing end caps, one for each end of the cylinder. A first of the end caps is similar in structure to that of the '701 patent, i.e. an elastomeric sealing material is sandwiched between two rigid plates bolted together with the bolts extending through the elastomeric material. When the end cap bolts are tightened, the elastomeric material is expanded outward to sealingly engage the outer cylinder. The splice assembly includes a skeletal frame connected between the first end cap and the second end cap through which cables to be spliced are introduced into the splicing assembly and closure. The second end cap also has an elastomeric material layer sandwiched between an inner and an outer plate, but each of the plates include four cable slots leading from the outside thereof to respective cable through holes in the elastomeric layer. The elastomeric layer is segmented such that a pair of outer sections between respective slot pairs are removable. The second end cap has attached thereto a pair of separable outer cable clamps sized to accommodate the outer, grounding sleeve of the optical ground cable and a pair of separable inner cable clamps, sized to accommodate the smaller, inner protective tube surrounding the optical fiber bundles. With this arrangement, with the outer elastomeric material segments removed, a continuous cable can be inserted into the cable clamps via the slots and thus into the splicing assembly without the need to sever the cable. The cable can then be securely clamped in place via both inner and outer cable clamps and the elastomeric material segments replaced prior to installation of the splicing assembly in the outer protective cylinder.

Attached to the skeletal frame are a pair of cable returns which encompass an arc segment with a diameter allows the fiber optic bundle to be doubled back on itself without exceeding a critical angle at which light will no longer be transmitted along the fiber strands. In addition, a centrally mounted splice tray support is provided for anchoring a variety of splicing trays for facilitating splicing operations.

The cylindrical enclosures of the '701 and '554 patents have worked very well over the years, but recently the demand for additional bandwidth has increased dramatically, requiring the use of cables with higher fiber counts. With increasing fiber counts, there has emerged a need for greater capacity within the splice enclosure, as each splice requires a discrete amount of physical space. In addition, there must be room enough within the splice enclosure to bend the cables without disrupting the light flow through the fibers. It has become apparent that a simple cylindrical enclosure does not provide the optimum internal dimensions to meet the needs of current fiber optic technology.

Previous attempts to address this problem have used enclosures having generally rectangular cross-sectional shapes. An example of this type of enclosure is the AFL OPTI-Guard splice enclosure produced by ALCOA. These rectangular enclosures provide additional splice capacity as compared to the cylindrical variety of splice enclosure, however the rectangular shape of these enclosures is not suitable for use with the proven expansion seal used in the '701 and '554 patents. This is true for at least two reasons: first, the flat sides of the rectangular enclosure are not sufficiently rigid to prevent distortion upon application of pressure from the seal; and second, the elastomeric sealing member cannot expand into the square corners of the enclosure sufficiently to guarantee a positive seal.

What is needed is a fiber optic splice enclosure which combines the effective expansion type seal of the '701 and '554 patents with a shape that provides the additional capacity demanded by today's bandwidth requirements.

SUMMARY OF THE INVENTION

The present invention is a splice enclosure for use with fiber optic cables. The enclosure comprises a cannister including a tubular wall and an opening bounded by the tubular wall at a first end thereof The tubular wall, and consequently the opening bounded by the tubular wall, have an oblong-round shape which may be in the form of an elongated circle, ellipse, or oval. The opening is closed by an expansion seal assembly sized and shaped to match the opening and which includes a plurality of cable receiving ports for admitting the fiber optic cables into the splice enclosure.

The seal assembly comprises a pair of generally rigid plates and an elastomeric sealing layer sandwiched between the plates. The plates are connected by a plurality of threaded fasteners such that when the fasteners are tightened, the plates are drawn together, thereby causing the sealing layer to be compressed between the plates and expand radially until it conforms to the shape of the opening, sealing the enclosure.

The elastomeric sealing layer is divided into three portions along a pair of parting lines, the parting lines lying generally parallel to the long axis of the sealing layer. Each of the cable receiving ports includes a pair of aligned slots in the inner and outer plates, the slots each extending inward from the edge of the respective plate to a point proximate one of the parting lines. This arrangement allows an existing cable to be looped into the splice enclosure for repair without severing the entire cable.

The oblong-round shape of the enclosure provides several advantages over the cylindrical enclosures of the prior art: first, the interior capacity of the cannister is greater, allowing for more splices to be made within a single enclosure; second, the increased width allows for the use of wider splice trays, allowing more splices to be made in a single tray; third, the increased width allows for more buffer tube storage as required in mid-sheath splices; fourth, the increased width of the enclosure allows the cables to be spliced without risk of bending the cables at such a sharp radius that light transmission will be impeded; and fifth, the oblong-round seal assembly has more edge area than a comparably sized cylindrical splice, allowing more cable receiving ports to be provided and thereby allowing more individual cables to be spiced within a single enclosure.

BRIEF DESCRIPTION OF THE DRAWINGS

FIG. 1 is an exploded perspective view of a splice enclosure embodying the present invention and adapted for use with all dielectric self supporting cable.

FIG. 2 is a perspective view of the splice enclosure of FIG. 1 showing the seal assembly disengaged from the protective cannister.

FIG. 3 is an end view of a splice enclosure adapted for use with optical ground wire.

FIG. 4 is a side view of the seal assembly of the enclosure of FIG. 3.

FIG. 4a is an optical ground wire for use with the enclosure of FIGS. 3 and 4.

FIG. 5 is a side view of the seal assembly of the enclosure of FIGS. 1 and 2.

FIG. 5a is an all dielectric self supporting cable for use with the enclosure of FIGS. 1, 2 and 5.

DETAILED DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference number 1 generally designates a cable spice enclosure embodying the present invention. The splice enclosure 1 is used to house and protect a plurality of splices between individual fibers of one or more fiber optic cables, which may be of any known variety of such cables, including all dielectric self supporting cable (ADSS) 3 and optical ground wire (OPGW) 4. As seen in FIG. 5a, all dielectric self supporting cable 3 includes of a plurality of buffer tubes 3a which carry the individual optical fibers. A fiberglass central strength member 3b runs down the center of the cable 3 between the buffer tubes 3a. An inner cable jacket 3c encases the buffer tubes 3a and the central strength member 3b. An outer strength member 3d of Kevlar or Aramid fibers surrounds the inner cable jacket 3c, and an outer cable jacket 3e surrounds the outer strength member 3d. Referring to FIG. 4a, optical ground wire 4 is a multi-layered structure including an outer twisted wire ground sheathing 4a, an inner protective aluminum tube 4b, and a number of buffer tubes 4c which contain the individual optical fibers.

As shown in FIG. 1, the splice enclosure 1 generally comprises an outer protective cannister 5 having an open end 7 and a closed end 9, an internal expansion seal assembly 11, and a mounting platform 13 which is connected to an inner surface of the seal assembly 11. The mounting platform 13 is sized and shaped to fit within the cannister 5 such that the seal assembly 11 closes the open end 7 of the cannister 5.

The cannister 5 is composed of a strong, water-impermeable, non-biodegradable and rigid material such as a highly impact resistant plastic. Forty percent glass-filled polypropylene has proven to be a particularly satisfactory material for the cannister 5, as it is much stronger and more durable than the polyvinyl chloride (PVC) electrical conduit used in the manufacture of many splice enclosures on the market.

The cannister 5 has a cross-section which is of an oblong-round shape such as an elongated circle, ellipse or oval, and it is this shape which results in the splice enclosure 1 having an increased capacity over the standard, cylindrical splice enclosures of the prior art. The cannister 5 generally comprises a tubular wall 15 which extends between the open end 7 and the closed end 9. The tubular wall 15 has an outer surface 17 and an inner surface 19. The closed end 9 of the cannister 5 is covered by an end wall 21 which is integrally molded with the tubular wall 15. The tubular wall 15 may taper somewhat along its length, such that the closed end 9 is smaller than the open end 7. The end wall 21 covering the closed end 9 is provided with a handle 22.

The open end 7 of the cannister 5 has an opening 23 defined by the tubular wall 15 for receiving the seal assembly 11. While a cannister 5 having an opening 23 of any oblong-round shape, including an ovate or elliptical opening 23, is considered to be within the scope of the present invention, the opening 23 is preferably in the form of an elongated circle wherein the tubular wall surrounding the opening 23 has two generally semicircular wall side portions 25 connected together by a pair of wall top and bottom portions 27. The top and bottom portions 27 may be straight or slightly curved in either an inward or outward direction, however it may be preferable that the top and bottom portions 27 curve inward slightly so as to pre-load the cannister 5 against any deflection of the tubular wall 15 which results from the sealing pressure exerted by the seal assembly 11.

In order to minimize such deflection of the tubular wall 15, the cannister 5 is reinforced proximate the open end 7 by a pair of reinforcing flanges 29 which extend outward from the outer surface 17 and encompass the opening 23. The flanges 29 are linked by a plurality of radially spaced longitudinal ribs 31. The remainder of the outer surface 17 of the tubular wall 15 is also reinforced for strength and rigidity by a network of encompassing and longitudinal ribs 33 and 35, respectively.

The seal assembly 11 generally comprises an inner plate 37, at least one outer plate 39 (two shown in FIG. 1), and an elastomeric sealing layer 41 sandwiched therebetween. The sealing layer 41 is comprised of three discrete pieces 43, 45 and 47 which abut one another along parting lines 49 and 51. A plurality of through holes are provided through the plates 37 and 39 as well as the sealing layer 41 for receiving a like number of bolts 55, which are preferably formed of stainless steel for corrosion resistence. The bolts 55 are threadably received by fixed nuts 57 attached to the inside of the inner plate 37.

As the ultimate purpose of the sealing assembly 11 is to seal the opening 23, the sealing layer 41 is shaped to closely conform to the shape of the opening 23. With the bolts 55 loosely installed, the sealing assembly 11 should slide easily into and out of the opening 23. As with the opening 23, the preferred shape of the sealing layer 41 is an oblong-round shape having a pair of semicircular side edges 59 connected by top and bottom edges 61. The top and bottom edges 61 may be either straight or slightly curved either inwardly or outwardly.

The plates 37 and 39 generally have the same outside dimensions as the sealing layer 41, sharing the same oblong-round shape having semicircular side edges 63 connected by top and bottom edges 65. In addition, the plates 37 and 39 each include a plurality of cable receiving slots or ports 67 and 69 for accepting the fiber optic cables. The slots 67 and 69 of the outer plate(s) 39 are aligned with the respective slots 67 and 69 of the inner plate 37. The slots 67, referred to as "backbone ports," are oriented generally perpendicular to one of the top or bottom edges 65 of the respective plate 37 or 39. The slots 69, referred to as "lateral ports," are oriented generally normal to the curve of the semicircular side edges 63 of the plate 37 or 39. Each of the ports 67 and 69 is arranged such that a cable passing through the port 67 or 69 will intersect the sealing member 41 at one of the parting lines 49 or 51. Holes will be drilled through the sealing member 41 at the respective parting line 49 or 51 to admit the cable into the enclosure 1.

An advantage of the oblong-round shape of the enclosure 1 is that the shape allows the addition of more cable receiving slots than is possible with a cylindrical enclosure. The more oblong the enclosure 1 is, the more backbone ports 67 can be added. An enclosure 1 having a 7.5" by 9.5" opening 23 can include four backbone ports 67, each capable of accepting up to a 1.25" diameter cable and four lateral ports 69, each of which is capable of accepting up to a 0.875" diameter cable.

The plates 37 and 39 further include a plurality of aligned holes or ground ports 71. The ground ports 71 serve as locations for inserting ground rods (not shown) when the splice enclosure 1 is used with cable requiring an isolated ground. In order to insert the ground rods, holes are drilled through the sealing member 41 in alignment with the ground ports 71. Each of the ground rods is hollow and accepts a ground wire for grounding the apparatus. Water tight compression connectors (not shown) are used to seal the joints between the ground rods and the ground wires.

The splice mounting platform 13 is mounted to the seal inner plate 37 by a pair of L-shaped brackets 73 which are secured to the inner surface of the seal inner plate 37 along the centerline thereof, proximate the side edges 63. The brackets 73 extend outwardly from the plate 37 in generally parallel relation to one another. The distal ends of both brackets 73 are attached to opposing legs of a generally U-shaped crosspiece 75 such that a bottom portion thereof extends horizontally between and below the brackets 73. The mounting platform 13 is secured to the bottom portion of the U-shaped bracket 75 and extends outwardly therefrom.

The mounting platform 13 serves as a mounting location for a splice tray holder 77 which serves to hold a plurality of splice trays 79 which contain the splices between the fibers of the cables. The tray holder 77 may be of any known type, such as the index style tray holder shown in FIG. 1. Stacking tray holders (not shown) may also be used. The oblong shape of the enclosure 1 allows the use of wider splice trays 79 than are used in conventional cylindrical splice enclosures, increasing the number of splices which can be housed in a single enclosure 1.

If the splice enclosure 1 is to be used with all dielectric self supporting cable 3, each cable receiving port 67 or 69 which is to be used is supplied with a stand-off bracket 81. As seen in FIGS. 1 and 5, the brackets 81 are generally L-shaped and are each fastened to the inner surface of the seal inner plate 37 proximate a cable receiving port 67 or 69 such that the longer leg of the bracket 81 extends outwardly toward the mounting platform 13. A stand-off clamp assembly 83 is affixed to a distal end of each stand-off bracket 81. The clamp assemblies 83 include a clamp member 85, which is generally in the form of a three-sided box sized to fit around the distal end of the bracket 81, and a threaded fastener 87 which passes through aligned receivers in the clamp member 85 and bracket 81 and threadably engages a nut 89.

The stand-off clamp assemblies 83 serve to secure the cables 3 to the seal assembly 11 by restraining the central and outer strength members of the cable 3. When the cable 3 is installed in the splice enclosure 1, the free ends of the central strength member 3b and outer strength member 3d are placed between the clamp member 85 and bracket 81. The fastener 87 is then tightened down, clamping the strength members 3b and 3d in place. The cable 3 is further restrained by a hose clamp 91 which is tightened around the cable 3 and the stand-off bracket 81. The combination of the clamp assembly 83 and the hose clamp 91 effectively constrains the cable 3 and inhibits it from being inadvertently pulled out of the enclosure 1.

If the splice enclosure 1 is to be used with optical ground wire 4, inner and outer cable clamp assemblies 93 and 95 respectively, shown in FIGS. 3 and 4, are used in place of the stand-off brackets 81 and stand-off clamp assemblies 83. The clamp assemblies 93 and 95 are generally as described in U.S. Pat. No. 5,479,554 and do not form a part of the present invention. Briefly, the inner cable clamp assemblies 93 are attached to the inner surface of the inner plate 37 and include two separable pieces 97 which are connected via threaded bolts. Each piece 97 includes a pair of curved depressions which, when the pieces 97 are connected, form a pair of cable receiving bores. Similarly, each of the outer clamp assemblies 95 are attached to the outer surface of the outer plate 39 and each include two separable pieces 99 which are connected via threaded bolts. Each piece 99 includes a pair of curved depressions which, when the pieces 99 are connected, form a pair of cable receiving bores. The cable receiving bores of the inner cable clamp assemblies 93 have a diameter x which is smaller than the diameter y of the bores in the outer cable clamp assemblies 95.

Prior to its introduction in the enclosure 1, the outer ground sheathing 4a and inner protective tube 4b are stripped from a length of the cable 4 at staggered locations. When the optical ground cable 4 is inserted through the seal assembly 11, the intact outer ground sheathing 4a is seated in the curved depressions of the outer clamp assembly 95 and the intact inner tube 4b extends through the elastomeric seal 41 and is then seated in the smaller bores in the inner clamp assembly 93. The inner clamp assembly 93 and the outer clamp assembly 95 are then assembled and the respective bolts tightened to securely hold the optical ground wire 4 in position.

In use, one or more fiber optic cables must be inserted through the seal assembly 11 to be spliced within the enclosure 1, and therefore a hole 101 must be formed through the elastomeric sealing layer 41 for each cable to be spliced. The holes 101 may simply be drilled through the elastomeric sealing layer 41 at one of the parting lines 49 or 51 and in alignment with one of the cable receiving ports 67 or 69. Alternatively, the elastomeric sealing layer 41 may be supplied with concentric ring cuts as disclosed by U.S. Pat. No. 5,048,382 to Edward P. Mitchell, entitled Method For Making Elastomeric Sealing Device. The concentric ring cuts are made in the elastomeric sealing layer 41 at the cable receiving ports 67 and 69 and produce multiple annular layers of material which can be removed from the sealing layer 41 to make a hole 101 with a diameter precisely matching the diameter of the cable. If the cable is ADSS cable 3, the hole 101 is sized to match the outside diameter of the outer cable jacket 3e. If the cable is OPGW 4, the hole 101 is sized to match the outer diameter of the inner protective aluminum tube 4b.

The multi-piece construction of the sealing layer 41 allows a loop of existing cable to be inserted into the enclosure 1 for repair without the necessity of cutting the cable, which would cause an interruption of service. In order to accomplish such a repair (known as a "mid-sheath splice"), one of the outer sections 43 or 47 of the sealing layer 41 is temporarily removed so that the loop of cable can be inserted through holes 101 at two of the cable receiving ports 67 or 69 along the respective parting line 49 or 51. After the cable is inserted, the missing sealing layer section 43 or 47 is replaced. A bead of RTV silicone sealant is preferably applied along the parting line 49 or 51 to aid sealing the joints between the sections 43, 45, and 47.

After the cables are inserted through the seal assembly 11, the cables are clamped down using either the stand-off clamp assemblies 83 or the inner and outer cable clamp assemblies 93 and 95 (depending on the type of cable used) as previously described. The necessary splices between the cables are made in the usual manner within the splice trays 79. Any of the buffer tubes 3a or 4c which do not require splicing (known as "expressed" tubes) are left intact and looped around the outside of the tray holder 77 and retained by optional expressed tube brackets (not shown) connected to the platform 13. The oblong-round shape of the enclosure 1 is particularly advantageous in these applications because the increased width of the cannister 5 provides room for more of the expressed tubes than is possible with a standard cylindrical enclosure.

When the cable splicing has been completed, the cannister 5 is installed on the enclosure 1 such that the seal assembly 11 is contained within the opening 23 of the cannister 5. The enclosure 1 is then sealed by tightening the bolts 55. Tightening of the bolts 55 draws the seal inner and outer plates 37 and 39 together, compressing the sealing layer 41 therebetween. Compression of the elastomeric sealing layer 41 between the plates 37 and 39 causes the edges of the sealing layer 41 to be forced outward, sealing the joint between the seal assembly 11 and the cannister 5. Simultaneously, the portions of the sealing layer 41 around the holes 101 contract, sealing the joints between the seal 11 and the cables. The cannister 5 may be equipped with an air valve 103 for "flash testing" of the seal after the bolts 55 are tightened.

It is to be understood that while certain forms of the present invention have been illustrated and described herein, it is not to be limited to the specific forms or arrangement of parts described and shown. It should be noted that although the cannister 5 is described and depicted herein as having a single open end 7 and a closed end 9 (an arrangement known as a "butt splice"), it is to be understood that the improvements of the present invention are equally applicable to "in-line splices" wherein the cannister 5 has a pair of open ends 7 and the enclosure 1 includes a pair of seal assemblies 11 for closing the ends 7.

What is claimed and desired to be secured by letters patent is as follows:

1. A splice enclosure for use with fiber optic cables, said enclosure comprising:
   a) a cannister including a tubular wall and an opening bounded by said tubular wall at a first end thereof, said opening being in the shape of an elongated circle, said tubular wall proximate said opening including a pair of generally semicircular sidewalls and opposing top and bottom walls joining said semicircular sidewalls; and
   b) a seal assembly sized and shaped for closing said opening and including a plurality of cable receiving ports for admitting the fiber optic cables into said splice enclosure, said seal assembly comprising:
      i) an inner plate;
      ii) an outer plate;
      iii) an elastomeric sealing layer sandwiched between said inner and outer plates; and
      iv) a plurality of threaded fasteners connecting said inner plate to said outer plate such that tightening of said fasteners draws said inner and outer plates together, compressing said elastomeric sealing layer therebetween and causing said elastomeric sealing layer to expand radially; wherein
      v) said inner and outer plates and said sealing layer each have a pair of generally semicircular side edges and a pair of opposing top and bottom edges joining said semicircular side edges.

2. The splice enclosure as in claim 1, wherein said sealing layer includes a parting line generally parallel to said sealing layer top and bottom edges, said sealing layer being divisible into two sections along said parting line.

3. The splice enclosure as in claim 2, wherein said cable receiving ports each include aligned slots in said inner and outer plates, each said slot extending inward from one of said edges of the respective one of said inner and outer plates, said slots terminating proximate said parting line in said sealing layer.

4. The splice enclosure as in claim 3, wherein some of said slots extend inward from one of said top and bottom edges of the respective inner or outer plate in generally perpendicular relation thereto and others of said slots extend inward from one of said semicircular side edges of the respective inner or outer plate in generally normal relation thereto.

5. The splice enclosure as in claim 1 and adapted for use with all dielectric self supporting fiber optic cable including a strength member, said splice enclosure further including a stand-off bracket connected to said seal assembly inner plate proximate one of said cable receiving ports and extending outwardly therefrom, said stand-off bracket having a clamp assembly secured thereto proximate a distal end thereof, said clamp assembly for engaging said cable strength member and thereby securing said cable relative to said splice enclosure.

6. The splice enclosure as in claim 1 and adapted for use with optical ground cable including an outer ground sheathing and an inner protective tube, said splice enclosure further including an outer clamp assembly connected to said seal assembly outer plate proximate one of said cable receiving ports and sized for engaging said cable outer ground sheathing and an inner clamp assembly connected to said inner plate proximate said one cable receiving port and sized for engaging an exposed portion of said inner protective tube, said clamp assemblies for securing said cable relative to said splice enclosure.

7. The splice enclosure as in claim 1, and further including a mounting platform secured to said seal inner plate and extending outwardly therefrom and a splice tray holder mounted on said mounting platform, said splice tray holder for holding a plurality of splice trays.

8. A splice enclosure for use with fiber optic cables, said enclosure comprising:
 a) a cannister including a tubular wall having first and second ends, said first end including an opening bounded by said tubular wall, said opening having an oblong-round shape; and
 b) a seal assembly sized and shaped for closing said opening and including a plurality of cable receiving ports for admitting the fiber optic cables into said splice enclosure, said sealing assembly comprising:
  i) an inner plate;
  ii) an outer plate;
  iii) an elastomeric sealing layer sandwiched between said inner and outer plates; and
  iv) a plurality of threaded fasteners connecting said inner plate to said outer plate such that tightening of said fasteners draws said inner and outer plates together, compressing said elastomeric sealing layer therebetween and causing said elastomeric sealing layer to expand radially.

9. The splice enclosure as in claim 8 wherein said oblong-round shape of said opening is an elongated circle, said tubular wall proximate said opening including a pair of generally semicircular sidewalls and opposing top and bottom walls joining said semicircular sidewalls.

10. The splice enclosure as in claim 9 wherein said top and bottom walls are straight.

11. The splice enclosure as in claim 9 wherein said top and bottom walls curve slightly inward.

12. The splice enclosure as in claim 9 wherein said top and bottom walls curve slightly outward.

13. The splice enclosure as in claim 8 wherein said oblong-round shape of said opening is an oval.

14. The splice enclosure as in claim 8, wherein said second end of said tubular wall is closed by an end wall.

15. The splice enclosure as in claim 14 and further including a gripping handle secured to said end wall and extending outwardly therefrom.

16. The splice enclosure as in claim 8, wherein:
 a) said oblong-round shape of said opening is an elongated circle, said tubular wall proximate said opening including a pair of generally semicircular sidewalls and opposing top and bottom walls joining said semicircular sidewalls;
 b) said inner and outer plates and said sealing layer each have a pair of generally semicircular side edges and a pair of opposing top and bottom edges joining said semicircular side edges;
 c) said sealing layer includes a parting line generally parallel to said sealing layer top and bottom edges, said sealing layer being divisible into two sections along said parting line; and
 d) said cable receiving ports each include aligned slots in said inner and outer plates, each said slot extending inward from one of said edges of the respective one of said inner and outer plates, said slots terminating proximate said parting line in said sealing layer.

17. The splice enclosure as in claim 16, wherein some of said slots extend inward from one of said top and bottom edges of the respective inner or outer plate in generally perpendicular relation thereto and others of said slots extend inward from one of said semicircular side edges of the respective inner or outer plate in generally normal relation thereto.

18. A splice enclosure for use with fiber optic cables, said enclosure comprising:
 a) a cannister including a tubular wall having a pair of generally semicircular sidewall portions, opposing top and bottom wall portions connecting said sidewall portions and first and second ends, said first end including an opening bounded by said tubular wall; and
 b) a seal assembly for closing said opening, comprising:
  i) an inner plate, an outer plate and an elastomeric sealing layer sandwiched between said inner and outer plates, said inner and outer plates and said sealing layer each having a pair of generally semicircular side edges and a pair of opposing top and bottom edges joining said semicircular side edges, said sealing layer including a parting line generally parallel to said sealing layer top and bottom edges, said sealing layer being divisible into two sections along said parting line;
  ii) a plurality of cable receiving ports for admitting the fiber optic cables into said splice enclosure, said cable receiving ports each including aligned slots in said inner and outer plates, each said slot extending inward from one of said edges of the respective one of said inner and outer plates and terminating proximate said parting line in said sealing layer, some of said slots extending inward from one of said top and bottom edges of the respective inner or outer plate in generally perpendicular relation thereto and others of said slots extending inward from one of said semi-circular side edges of the respective inner or outer plate in generally normal relation thereto; and iii) a plurality of threaded fasteners connecting said inner plate to said outer plate such that tightening of said fasteners draws said inner and outer plates together, compressing said elastomeric sealing layer therebetween and causing said elastomeric sealing layer to expand radially.

19. The splice enclosure as in claim 18 wherein said second end of said tubular wall is closed by an end wall.

* * * * *